United States Patent
Luzzatti et al.

(10) Patent No.: US 8,326,992 B2
(45) Date of Patent: Dec. 4, 2012

(54) CONTROLLING THE PROVISION OF RESOURCES FOR STREAMING OF VIDEO SWARMS IN A PEER-TO-PEER NETWORK

(75) Inventors: Omer Luzzatti, Tel Aviv (IL); Lev Korostyshevsky, Jerusalem (IL)

(73) Assignee: Ray-V Technologies, Ltd., Tel-Aviv (IL)

( * ) Notice: Subject to any disclaimer, the term of this patent is extended or adjusted under 35 U.S.C. 154(b) by 128 days.

(21) Appl. No.: 12/751,306

(22) Filed: Mar. 31, 2010

(65) Prior Publication Data
US 2010/0306383 A1 Dec. 2, 2010

Related U.S. Application Data

(63) Continuation-in-part of application No. 12/473,006, filed on May 27, 2009, now Pat. No. 8,051,194.

(51) Int. Cl.
*G06F 15/173* (2006.01)
(52) U.S. Cl. .......................... 709/226; 725/95
(58) Field of Classification Search .............. 709/201, 709/204, 226; 707/622; 725/95
See application file for complete search history.

(56) References Cited

U.S. PATENT DOCUMENTS

| | | | |
|---|---|---|---|
| 6,983,326 B1 | 1/2006 | Vigue et al. | |
| RE39,135 E * | 6/2006 | Riddle | 709/204 |
| 7,062,555 B1 | 6/2006 | Kouznetsov et al. | |
| 7,174,385 B2 * | 2/2007 | Li | 709/231 |
| 7,209,973 B2 | 4/2007 | Tormasov et al. | |
| 7,577,750 B2 * | 8/2009 | Shen et al. | 709/231 |
| 2002/0161898 A1 | 10/2002 | Hartop et al. | |
| 2004/0236863 A1 | 11/2004 | Shen et al. | |
| 2005/0216559 A1 | 9/2005 | Manion et al. | |
| 2006/0007947 A1 | 1/2006 | Li et al. | |

(Continued)

FOREIGN PATENT DOCUMENTS

WO 2007/110865 10/2007

OTHER PUBLICATIONS

Mohamed Hefeeda, et al., "PROMISE: Peer-to-Peer Media Streaming Using CollectCast", ACM Multimedia '03, pp. 45-54, Nov. 2003.

(Continued)

*Primary Examiner* — Bharat N Barot
*Assistant Examiner* — Marie Georges Henry
(74) *Attorney, Agent, or Firm* — Myers Wolin, LLC

(57) ABSTRACT

A method for controlling the provision of resource nodes for streaming multimedia content of a channel viewed by consumer nodes in a peer-to-peer network. The method comprises initializing the channel with at least an initial number of resource nodes allocated to provide a desired level of quality of service (QoS) to the consumer nodes, the resource nodes and the consumer nodes are part of the peer-to-peer network; checking periodically a number of consumer nodes currently connected to the channel and an experienced level of QoS of the channel; predicting, based on the number of the consumer nodes currently connected, an increase trend or a decrease trend in the number of consumer nodes, and the experienced level of QoS level, a number of predicted consumer nodes of the channel and a predicted number of resource nodes required to provide the desired level of QoS; and changing the number of resource nodes allocated to the channel to provide the desired level of QoS and to meet the predicted number of consumer nodes.

11 Claims, 5 Drawing Sheets

U.S. PATENT DOCUMENTS

2006/0224687 A1 10/2006 Popkin et al.
2006/0230107 A1* 10/2006 Yu et al. .................. 709/204
2006/0242315 A1 10/2006 Nichols
2007/0211677 A1 9/2007 Laroia et al.
2008/0134258 A1 6/2008 Goose et al.
2010/0153578 A1* 6/2010 Van Gassel et al. ......... 709/231

OTHER PUBLICATIONS

Xinyan Zhang, et at., "CoolStreaming/DONet: A Data Driver Overlay Network for Efficient Live Media Streaming", Mar. 2005.

* cited by examiner

CONTROLLING THE PROVISION OF RESOURCES FOR STREAMING OF VIDEO SWARMS IN A PEER-TO-PEER NETWORK

CROSS-REFERENCE TO RELATED APPLICATIONS

This application is a continuation-in-part of U.S. application Ser. No. 12/473,006, filed on May 27, 2009 by common assignee, the contents of which are herein incorporated by reference.

TECHNICAL FIELD

The present invention relates generally to content delivery in a peer-to-peer network and more specifically to a method of per peer allocation of bandwidth quota for a delivery of content between the peers.

BACKGROUND OF THE INVENTION

The ubiquity of the Internet enables new techniques adaptation to enable direct distribution of multimedia files and real-time media streaming to end-users in an electronic format. The advantages associated with electronic distribution allow media content providers to establish global distribution systems for digital content. Furthermore, new compression algorithms, designed specifically for multimedia data, dramatically reduce the bandwidth and storage space required for the electronic distribution of multimedia data. This, together with the availability of broadband communication, encourages content providers to adopt the Internet as an alternate distribution system complementing the conventional distribution systems (e.g., cable or satellite TV).

Peer-to-peer (P2P) or grid networks enable the distribution of media between users without using server centric solutions. As an example, P2P file sharing systems are well known in the industry and use a very efficient technology to deliver media. Examples for such P2P systems are BitTorrent® and Gnutella. However, these systems do not distribute the content in real-time. Rather, a user can download the content (files) and view it only when the download has completed, i.e., a user cannot view the file (e.g., a movie) while downloading it.

Recently, new systems for real-time streaming over P2P networks have been developed. Examples for such systems may be found in "A Data Driver Overlay Network for Efficient Live Media Streaming" by Zhang, et al. and in "Peer-to-Peer Media Streaming Using CollectCast", by Hefeeda, et al., both of which are incorporated herein by reference merely for the useful understanding of the background of the invention. Real-time streaming systems fail to fully utilize the network's resources, as they do not consider the asymmetric nature of the nodes (peers) in a typical Internet protocol (IP) network.

Generally, such systems consider the upload bandwidth of nodes as equal to the download bandwidth. This is rarely the case in IP networks, such as asymmetric digital subscriber line (ADSL) and cable based networks, as in most cases a node's upload bandwidth is half or less of the bandwidth of the download. Another type of real-time P2P network for distributing media can be found in PCT application number PCT/IL2007/000392 entitled "Realtime Media Distribution in a P2P Network", by Omer Luzzatti, et al. (hereinafter "Luzzatti") which is assigned to common assignee and incorporated herein by reference merely for the useful understanding of the background of the invention. Luzzatti discloses a real-time P2P network where nodes in the network can act in the role of 'amplifiers' to increase the total available bandwidth made available in the network and thus to improve the quality of the media consumed by the viewers.

In such systems, where the video delivery to an accepting node is from one or more donating nodes, it is essential to maintain the quality of the video content. That is, it is important to ensure that video streams continue to be pleasurable to the eye and ear. A common approach to address this requirement is to have a buffer that buffers a few seconds of the data stream delivered to the accepting node. However, due to changes in network traffic patterns, or the availability of a donating node to provide data to the accepting node, such phenomenon occurs and results in undesirable visual or audio appearance. Furthermore, changes in loads between different channels, geographical areas and zones also impact the reliability of the service. Below a certain service level, the quality of service is insufficient for the transmission of video swarms.

It would be therefore advantageous to provide a solution for managing a system for providing video swarms responding to changes in load patterns. It would be further advantageous to enable effective and efficient allocation of additional nodes that are necessary to provide a desired level of quality of service of the video swarms in a plurality of channels.

SUMMARY OF THE INVENTION

Certain embodiments of the invention include a method for controlling the provision of resource nodes for streaming multimedia content of a channel viewed by consumer nodes in a peer-to-peer network. The method comprises initializing the channel with at least an initial number of resource nodes allocated to provide a desired level of quality of service (QoS) to the consumer nodes, the resource nodes and the consumer nodes are part of the peer-to-peer network; checking periodically a number of consumer nodes currently connected to the channel and an experienced level of QoS of the channel; predicting, based on the number of the consumer nodes currently connected, an increase trend or a decrease trend in the number of consumer nodes, and the experienced level of QoS level, a number of predicted consumer nodes of the channel and a predicted number of resource nodes required to provide the desired level of QoS; and changing the number of resource nodes allocated to the channel to provide the desired level of QoS and to meet the predicted number of consumer nodes.

Certain embodiments of the invention also include a system for providing streaming multimedia content in a peer-to-peer network. The system comprises a broadcasting server for broadcasting a channel of the streaming multimedia content; a plurality of nodes that can act either as consumer nodes for viewing the channel or resource nodes for streaming multimedia content of the channel; and a management server for allocating an initial number of resource nodes from the plurality of nodes to provide a desired level of quality of service (QoS) to the channel and thereafter determining, based on a predicted number of consumer nodes, if a change in the number of initial allocated number of resource nodes is needed; wherein the management server, the broadcasting server, and the plurality of nodes are connected to a network.

Certain embodiments of the invention also include a server for controlling the provision of resource nodes for streaming multimedia content of a channel viewed by consumer nodes in a peer-to-peer network. The server comprises a processor; a memory for containing instructions that when executed by the processor cause the processor to perform the steps of: initializing the channel with an initial number of resource nodes allocated to provide a desired level of quality of service (QoS) to the consumer nodes, the resource nodes and the consumer nodes are part of the peer-to-peer network; checking periodically a number of consumer nodes currently connected to the channel and an experienced QoS level of the channel; predicting, based on the number of the consumer nodes currently connected, an increase trend or a decrease trend in the number of consumer nodes, and the experienced level of QoS level, a number of predicted consumer nodes of the channel and a predicted number of resource nodes required to provide the desired level of QoS; and changing the number of resource nodes allocated to the channel to provide the desired level of QoS and to meet the number of predicted consumer nodes.

BRIEF DESCRIPTION OF THE DRAWINGS

The subject matter that is regarded as the invention is particularly pointed out and distinctly claimed in the claims at the conclusion of the specification. The foregoing and other objects, features and advantages of the invention will be apparent from the following detailed description taken in conjunction with the accompanying drawings.

DETAILED DESCRIPTION OF THE INVENTION

Figure 1:
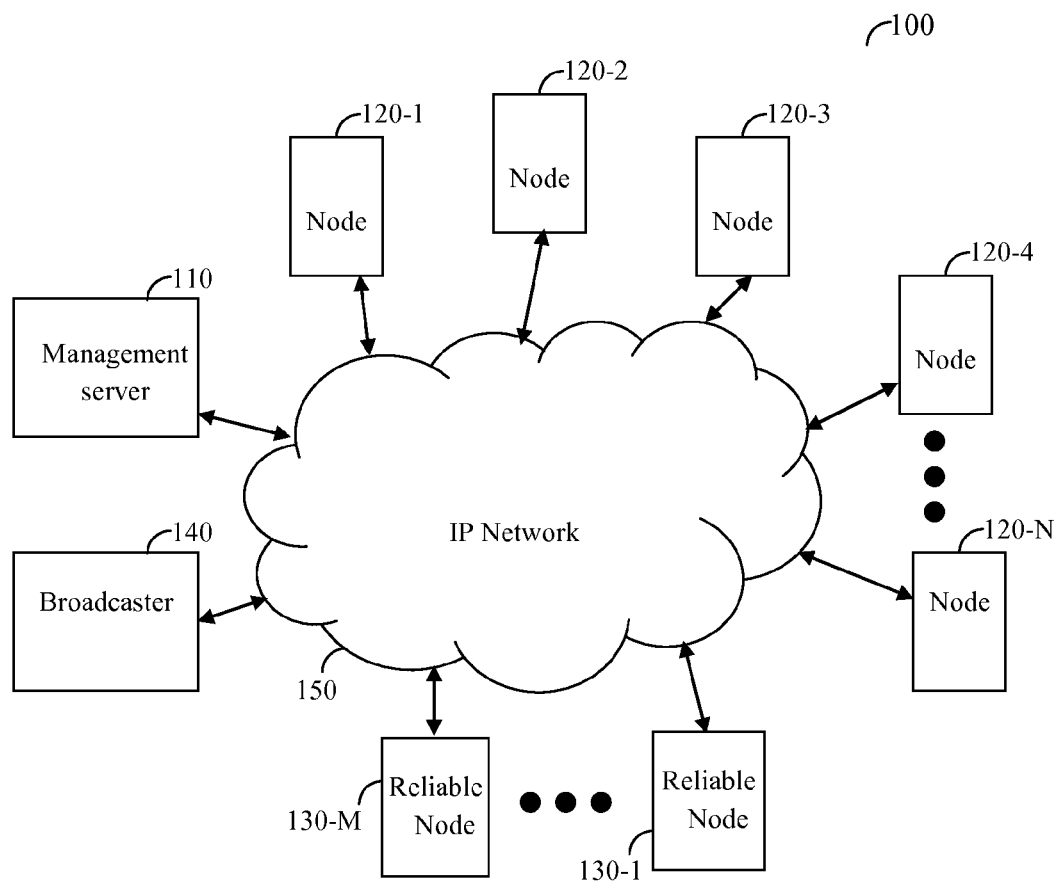
FIG. 1 is a diagram of a P2P network used to describe the principles of the invention.

The embodiments disclosed by the invention are only examples of the many possible advantageous uses and implementations of the innovative teachings presented herein. In general, statements made in the specification of the present application do not necessarily limit any of the various claimed inventions. Moreover, some statements may apply to some inventive features but not to others. In general, unless otherwise indicated, singular elements may be in plural and vice versa with no loss of generality. In the drawings, like numerals refer to like parts through several views.

In a peer-to-peer system providing video swarms, it is necessary to ensure quality of service to a plurality of viewers. Viewers of a channel may increase or decrease in numbers changing the loads on primary and secondary resources that are designed to reliably provide the service. Accordingly, it is necessary to predict future bandwidth consumption by viewers of a channel as they increase or decrease in numbers. Moreover, by anticipating loads on the system, nodes may be added to a channel and/or moved to handle load from another channel to assist in handling the load. The result is a higher quality of service and efficient utilization of nodes available in the system.

FIG. 1 shows a non-limiting and exemplary block diagram of a P2P network 100 used to describe the principles of the invention. The P2P network 100 includes a plurality of nodes (peers) 120-1 through 120-N (collectively referred to as nodes 120), reliable nodes 130-1 through 130-M (collectivity referred to as nodes 130), and a broadcaster 140, all of which communicate with each other over an Internet protocol (IP) network 150. The P2P network 100 further includes a management server 110. The management server 110 may comprise a central processing unit (CPU) coupled to a memory (both are not shown). The memory contains instructions that when executed by the CPU allows for the management of the P2P network 100 in general, and in particular the allocation of at least resource nodes 120 to a broadcast channel in accordance with the principles of the invention discussed herein below in greater detail. The P2P network 100 is utilized to distribute content in several parallel (and alternative) "channels". For example, the P2P network 100 may distribute several unrelated channels (e.g., TV-like channels) of real-time streaming media, with viewers who can choose to view one particular stream at a time. In a preferable implementation there will be at least two reliable nodes 130. While a single broadcaster 140 is shown herein, a plurality of broadcasters may be coupled to network 150 without departing from the scope of the invention.

The nodes 120 and reliable nodes 130, distributing the content of a particular channel, constitute a "channel swarm". The nodes 120 may be, but are not limited to, personal computers, servers, smart phones, portable media devices, media control devices, set-up boxes, or any other device capable of exchanging data with other nodes connected to it. A node (120 or 130) may also refer to a module of a software system such as a media player application. Each node 120 can act as a consumer-node and/or a resource-node. Typically, reliable nodes 130 are used only for the purpose of providing content and such nodes receive content from a broadcaster 140. In a typical embodiment of the invention reliable nodes 130 are placed at central points of the network 150 that are considered to be valuable for the distribution of data. For example, a certain geographical area (also referred to herein as a zone, even though it should be noted that a zone may also be other partitions of nodes), for example, a town may have one or two reliable nodes 130 in general network proximity to the nodes 120 it may serve. A reliable node may be relied to provide a consistent bandwidth and be generally available to the nodes it serves, unlike the other resource nodes, as explained below, which may be available or unavailable, or change bandwidth, over relatively short periods of time.

A consumer node, also referred to as an acceptor or viewer, is a node 120-$c$ (where c is an integer greater than or equal to 1) that belongs to an end-user who wants to watch a channel (i.e., to consume the real-time content). Each consumer-node is constrained to join one or more channel-swarms as determined by the end-user, and must receive a complete, consumable stream of the real-time content. An end-user can view media content broadcasted in a channel on a display connected to the consumer-node. This includes, but is not limited to, a TV screen connected to a set-up box, a monitor connected to a personal computer, a portable multimedia device, and the like. It should be noted that a consumer node may also operate as a resource node, or a donor, to another node 120 of the network 150.

A resource node is a node 120-$r$ (where r is an integer greater than or equal to 1) with an available upload bandwidth that can be contributed to the one or more channel-swarms. In accordance with one embodiment a resource-node may be a dedicated network device that shares its bandwidth, but does not consume the media. Such devices are typically installed by service providers, but may also be nodes that are otherwise consumer nodes bit are presently not used for viewing of video swarms. A resource-node may be also an amplifier as described in greater detail in Luzzatti. It should be noted that different resource-nodes may have different capabilities, and in particular may be differently capable of providing resources to different consumer-nodes. The allocation of particular resource-nodes to a channel should be chosen to guarantee a certain quality of service, while minimizing the overhead associated with joining a channel swarm.

Figure 2:
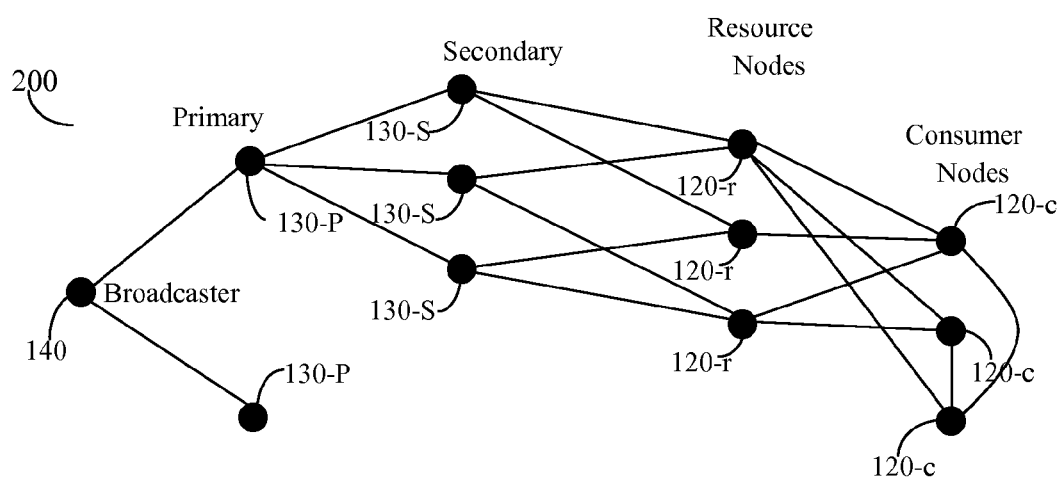
FIG. 2 is a data connectivity diagram describing the connections between the nodes of the P2P network used to deliver video swarms.

FIG. 2 provides an exemplary and non-limiting data connectivity diagram 200 describing the connections between the nodes in accordance with the invention. A broadcaster 140 is connected to one or more primary reliable nodes 130-P, each primary reliable node 130-P connected optionally to one or more secondary reliable nodes 130-S. Using this kind of option configuration of primary and secondary reliable nodes may improve the quality of service (QoS). A consumer-nodes 120-c is connected to other consumer nodes 120-c, to resource nodes 120-r (i.e., nodes which are at least not currently used in a viewing mode), and to secondary reliable nodes 130-S, if those exist, or otherwise, directly to primary reliable nodes 130-P. However, as loads change, i.e., there is a different demand for services while a desire to maintain a quality of service, there is a need to dynamically allocate secondary nodes 130. A static view such as shown in FIG. 2 may not suffice.

Figure 3:
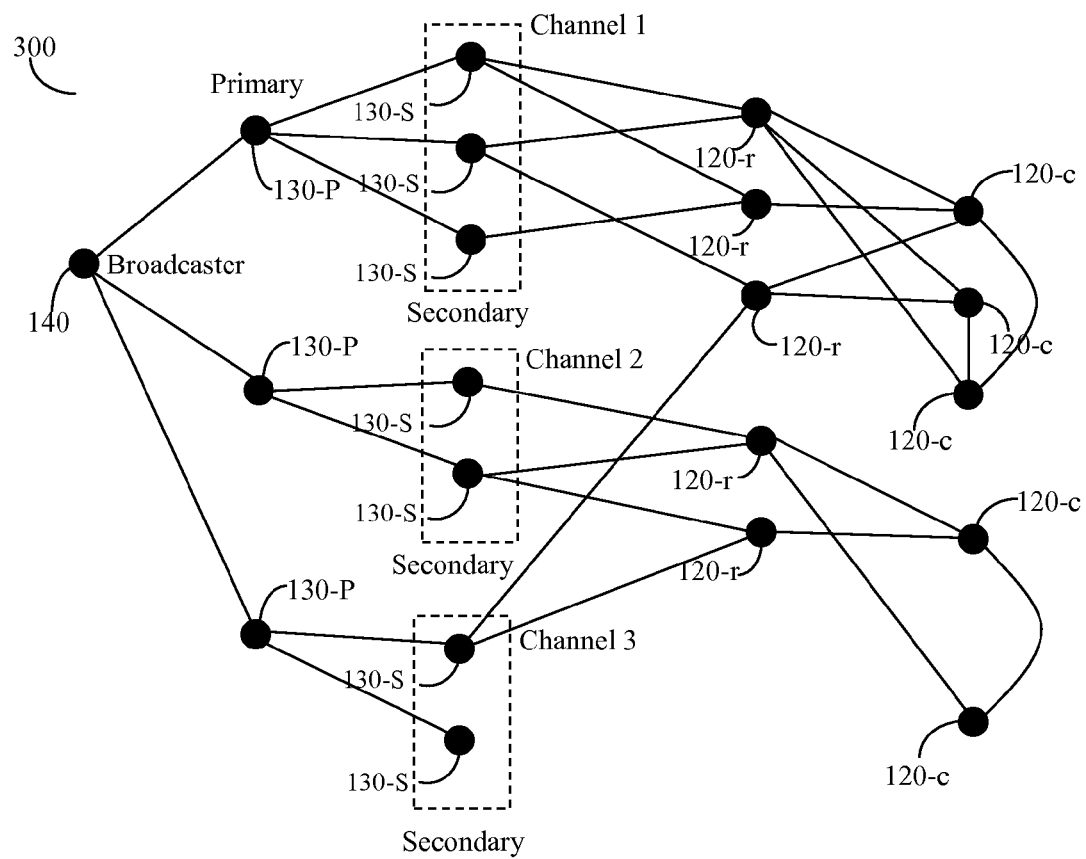
FIG. 3 is an extended data connectivity diagram with channel oriented nodes in accordance with the principles of the invention.

FIG. 3 shows an exemplary and non-limiting diagram 300 of an extended data connectivity with channel oriented secondary nodes provided in accordance with the principles of the invention. The operation of the broadcaster 140 and the primary reliable nodes 130-P has been discussed above. The secondary reliable nodes 130-S are grouped by channels, each channel having its own group of secondary reliable nodes 130-S. The channel nodes of reliable nodes 130 are allocated based on an initial anticipation of usage of such nodes to ensure the desired level of service quality. While channel orientation is shown herein, other grouping may also be used, including but not by way of limitation, geographical grouping or zones. Moreover, a combination of geographic and channel grouping may be used without departing from the scope of the invention. By balancing the use between channel oriented reliable secondary nodes 130-S, it is possible to effectively and automatically manage the quality of service provided by the system to the consumer nodes 120-c.

As can be seen in the exemplary and non-limiting FIG. 3, there are three channels, Channel 1, Channel 2, and Channel 3, each having several secondary reliable nodes 130-S each channel serviced by a reliable primary node 130-P. In one embodiment, a reliable primary node 130-P may service more than one channel. Typically, the channel oriented secondary reliable nodes 130-S service their respective resource nodes 120-r and consumer nodes 120-c. However, when there is a need for additional bandwidth, reliable nodes 130 (either primary or secondary) from one channel may be used to kick-in and provide additional bandwidth. This may include full release from one channel and transfer into another channel or, allocating a portion of the designated reliable node 130 to provide a certain amount of bandwidth to the channel requiring additional channel bandwidth. The control over the connectivity of the secondary reliable nodes 130-S is performed, for example, by the management server 110, the operation of which is described with respect to FIG. 4.

Figure 4:
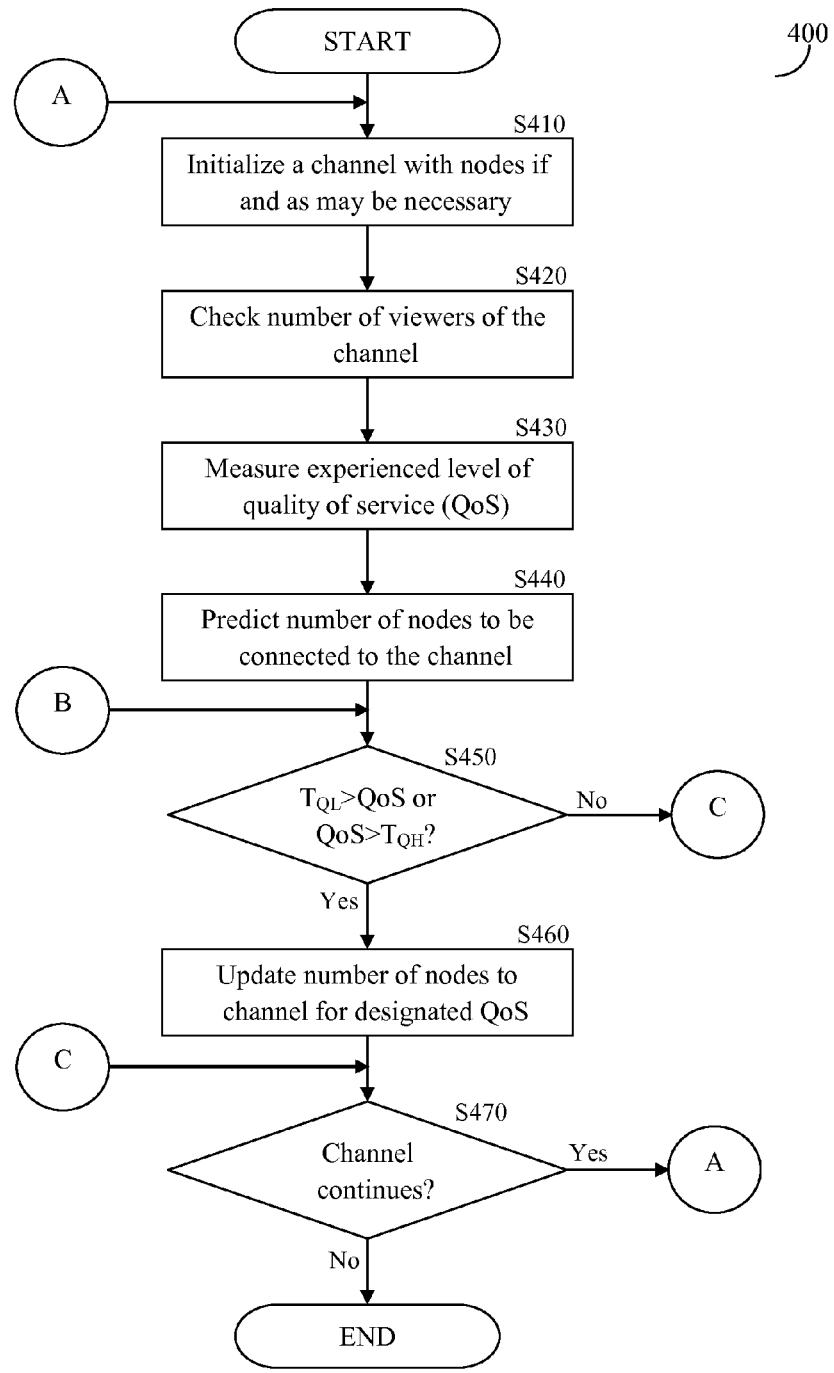
FIG. 4 is a flowchart depicting the operation of the P2P system illustrated in FIG. 3.

FIG. 4 depicts an exemplary and non-limiting flowchart 400 of the operation of a system having the extended data connectivity such as shown in FIG. 3. In S410 a channel is initialized, if necessary, with secondary reliable nodes 130-S and resource nodes 120-r in anticipation of the channel characteristics. In one embodiment of the invention initialization takes place also in anticipation of increased utilization. This for example, and not by way of limitation, may occur when an important sports event is streamed and additional bandwidth is known in advance to be necessary. In S420 the current number of consumer nodes 120-c connected to the channel is collected. This is necessary as it is the responsibility of each of the consumer nodes 120-c to determine to which secondary nodes to connect. Hence, the management server 110 needs to determine the current number of consumer nodes 120-c that are connected to the channel. In S430 the experienced level of quality of service (QoS) of the channel is checked, either as a direct or indirect measure.

In S440, the process predicts the number of consumer nodes 120-c to connect to the channel based on information such as, but not limited to, the current number of consumer nodes, the trend in the number of consumer nodes, and the experienced level of QoS of the channel. This prediction is important and must behave in a way that ensures a guaranteed level of QoS. Furthermore, it must take into account the delay between the prediction and the actual change in the system configuration. That is, in an embodiment of the invention, if additional resource nodes or reliable nodes are necessary to increase the bandwidth, it may take several minutes for the system to properly and fully configure. Therefore, an increase in the number of consumer nodes 120-c, must be reflected in an overshoot in allocation of resource nodes 120-r and secondary reliable nodes 130-S, when applicable, assuming that there is an increasing trend that requires such additional allocation.

By contrast, in another embodiment, a decrease in the number of consumer nodes 120-c connected to the channel should not be treated in a manner of overshoot, but rather gradually reducing the number of allocated nodes proportionately to the drop of consumer nodes 120-c. This can be achieved, for example, by keeping the reduction of resource nodes 120-r and/or secondary reliable nodes 130-S proportionate to the observed reduction in consumer nodes 120-c, and further by delaying the reduction of the number of such nodes, for example, waiting for a period of time after a decrease in the number of consumer nodes 120-c is observed, waiting for two consecutive decreases in the number of consumer nodes 120-c or more, and so on.

In S450, it is checked if a predicted level of QoS for the predicted number of consumer nodes 120-c is either below a minimum QoS threshold value (TQL) or above a maximum QoS threshold value (TQH) value, and if so execution continues with S460; otherwise, execution continues with S470. It should be understood that the de-facto state of the channel is measured either directly or indirectly, i.e., the actual QoS of the channel or a measurement implying it. In S460, reliable nodes 130-S (either secondary or primary), and/or resource nodes 120-r are either allocated to or dealloacted from the channel to ensure that the desired QoS is maintained and that the predicted number of consumer nodes are supported. It should be noted that the provided level of QoS is in the range of minimum and maximum guaranteed levels. In S470 it is checked if the channel continues to operate, and if so execution returns to S410; otherwise, execution terminates.

It should be noted that while the description hereinabove is with respect to a channel, other groupings may be used, including but not limited to geographical grouping. Moreover, several levels of groupings may be used, for example a channel grouping within a geographical grouping, without departing from the scope of the invention.

Following is an exemplary and non-limiting description of a management service, implemented in accordance with the principles of the invention on the management server 110. The management server 110 is aware of all the activity of the system 100. The system's primary entities are channels, each channel providing video swarms. Viewers may join such channels by means of a node 120, enabled to perform such tasks. Similarly, broadcaster entities, such as the broadcaster 140, may also join the system 100.

To provide bandwidth for distributing video swarms from the broadcaster 140 to consumer nodes 120-c, the system 100 must provide resources to the channel. That is, the management server 110 needs to order such resources to join the channel. The management server 110 has the following resources at its disposal: satellites (S) that are reliable nodes 130 generally located at strategic network centers, such as and without limitations, points of presence (POPs); and, amplifiers (A) that are end user nodes (e.g., nodes 120) partially utilized by the management server 110 for the purpose of donating bandwidth to the P2P network. Satellites, amplifiers, viewers and broadcasters of any single channel are collectively referred to as peers.

In accordance with the principles of the invention the management server 110 remotely controls resources to attain two goals: maintain a desirable level of QoS by creating the conditions under which every viewer can enjoy sufficient viewing quality assuming enough resources are available in the system 100; and, control costs by minimizing operational costs for a desired level of QoS.

In accordance with the principles of the invention in order to achieve a desired QoS, the management server must ensure several conditions to happen. An ample number of satellites must be provided to a channel. Accordingly, a fixed viewers/satellite (V/S) ratio is maintained for each channel. Different channels may have different V/S ratios, for example, 100, based on a desired stream quality, service level and other considerations. Similarly, it is necessary that the management server 110 introduces a sufficient number of amplifiers. Accordingly, a fixed viewers/amplifiers (V/A) ratio for example 3.5, is maintained for each channel, typically through initialization information. Different channels may have a different V/A ratio, based on a desired stream quality, service level and other considerations.

The management server 110 is designed to address several technical challenges. Firstly, as noted above, it takes some time to bring a resource into a channel, let alone the time it takes other units to become aware of the presence and availability of the resource. Secondly, as a result, any decision made based on viewers' activity in channels must take into account not only the real-time state, but also predict trends into the near future, so that the management server 110 can provide resources fast enough, overshooting ahead of the trend. This makes particular difference in case of unusually rapid entrance of viewers into a channel, e.g., at the beginning of a popular show or sports event. However, too much of an overshoot is expensive, because resources might be tied up where they would not be truly required and possibly better serve other needs of the system 100. Thirdly, the management server 110 is to maintain stability in channels, and not to remove resources abruptly. If the number of viewers of a channel drops, i.e., less consumer nodes 120-c (of viewers) are connected to a channel, resources should be removed gradually, so that viewers that remain connected to the channel do not suddenly lose all their bandwidth donors. Such a reduction can be achieved by keeping the reduction of nodes proportionate to the reduction of viewers, and further by delaying the reduction of the number of nodes, for example, waiting for a period of time after a decrease in the number of viewers is observed, waiting for two consecutive decreases in the number of viewers or more, etc. Fourthly, as with any adaptive system, there is risk involved that the management server 110 does not bring resources fast enough, or that the resources do not start providing their respective service to viewers of a channel on time. Therefore, in case of televised events, real-time or not, that are of special importance, it is best to inform the management server 110 in advance of such event. This can be performed, for example, by informing that a certain number of viewers must to be supported on a specific channel at a particular time.

According to the principles of the invention, the technical challenges mentioned above are addressed by the management server 110 as described herein below. As mentioned above, both viewers and resources are divided by the management server 110 into groups, for example, based on channels. This enables matching resources to viewers in each channel. According to the invention other ways of grouping of users and resources are also possible, as further discussed hereinabove. For example, and without limiting the scope of the invention, groups may be created to represent the best match for QoS between viewers in the group and their potential resources.

The management server 110 is therefore enabled to perform three tasks to address these challenges. A statistical task (STATS) is used to count the numbers of viewers (V), amplifiers (A) and satellites (S) of each channel. The management server 110 also calculates a value Vt, which is the target number of viewers that needs to be supported by the other jobs. As explained below, it might be higher or lower than the number V. Satellite Control (SC) is used to calculate St for each channel. St is the target number of satellites that are needed to support a number of Vt viewers. Also, SC is enabled to add and/or remove satellites so that S will equal St. Amplifier Control (AC) is the equivalent of SC for the amplifiers. It is used to calculate a value At, which is the target number of amplifiers that are needed to support Vt viewers. Also, AC is enabled to add and/or remove amplifiers so that A will equal At.

Figure 5:
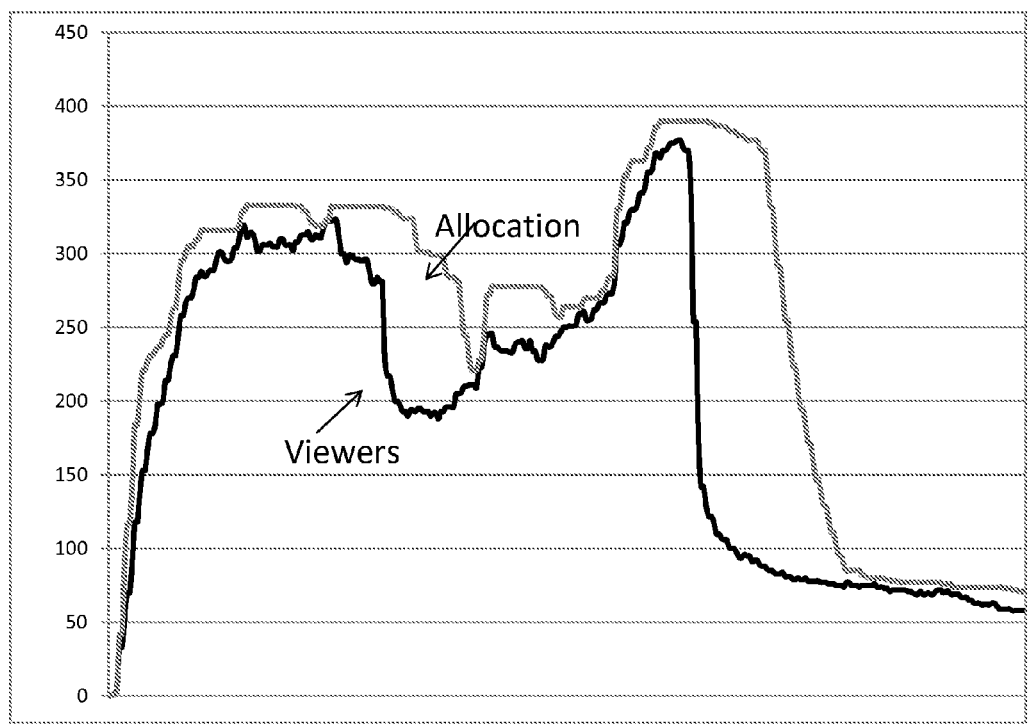
FIG. 5 is a diagram demonstrating the dynamic allocation of nodes versus the number of viewers.

Following is a more detailed description of the STATS task. Typically, STATS runs as often as every 10 seconds. It is assigned to calculate V, A, and S for any channel and constitutes aggregation of data known to the management server 110. The calculation of Vt involves a more complex statistical calculation, including historical statistical results of the system 100, for example and without limitation, dating up to 10 minutes back. Vt is the actual number of viewers in a given channel to be supported at a given point in time. In this respect support means the introduction of a sufficient number of amplifiers and satellites. Notably, Vt differs from V in that it takes into account the viewership trend. For example, if the number of viewers of some channel rises abruptly from 1,000 to 5,000, Vt should be as high as 8,000, because by the time resources are deployed, V may have grown further. Therefore, the management server 110 is enabled to overshoot the target. That is, in the exemplary case, enabling the support of a Vt equal to 8,000 rather than to 5,000. The fact that Vt depends on historical data means that the management server 110 has a learning curve when responding to a changing load. By enabling this kind of overshoot, the management server 110 is capable of enabling the system 100 to handle effectively such cases even in the most extreme scenarios. In one embodiment of the invention two Vt numbers are used, one for amplifiers and the other for satellites, because amplifiers and satellites have different response times, and so need different degree of overshooting. In practice, both numbers are the same because the differences are not sufficiently significant to warrant the complexity. Naturally, the number of viewers may also go down for each channel. The STATS task also adapts thereto but, by contrast, when the number of viewers goes down, no overshoot takes place. Moreover, in order to ensure QoS, the value Vt descends much slower than V does. Exemplary and non-limiting FIG. 5 demonstrates the dynamic allocation of nodes versus the number of viewers with respect to specific parameters of a system.

The management server 110 further supports for STATS scheduling hints. These may be used, for example, for the purpose of controlling the parameters of a certain period of time in some particular channel. The hint specifies an expected number of viewers in each channel during that period. Hints allow preparing for massive TV events a few minutes in advance, to make sure the learning curve of the grid service when estimating Vt is reduced to zero. Accordingly, during the period range provided by a hint, the Vt for that channel will not be lower than the expected number of viewers in that channel, as specified by the hint.

Once Vt is determined At and St, which are respectively the target numbers of amplifiers and satellites needed for a channel, can be also calculated. This is done periodically by SC and AC respectively for At and St. Because the nodes are, in principle, identical a single discussion will now follow. As mentioned above, each channel has the following attributes provisioned: a desired V/A ratio and a desired V/S ratio. Typically, these ratios are chosen based on business considerations, video quality and more. At or St are determined by dividing Vt by the respective ratio. In the case where A=At no further calculation needs to be done, and similarly when S=St. If, however, A>At or S>St, the extraneous resources are removed by management server 110 due to the respective constraint. That is, amplifiers are removed if A>At or Satellites are removed if S>St. If A<At or S<St, then the management server 110 is enabled to add unused resource to the channel. As long as resources are available to the channel such resources are deployed by the management server 110. However, if the channel lacks a sufficient number of resources to address the need, then the management server 110 is enabled to add resources from, for example, another channel or channels as backup resources.

In one embodiment of the invention backup nodes are available to support unexpected demand for bandwidth. Therefore, according to the invention, any available resource allocated to a channel is first allocated to the channel that needs resources. Resources may be 'lent' from one channel to another channel as backup resources and typically only as a last resort. It should be noted that having too many backup nodes in reserve for a channel is not a desirable situation, thus there is a need to move them out of the channel.

The principles of the invention may be implemented in hardware, firmware, software or any combination thereof. Moreover, the software is preferably implemented as an application program tangibly embodied on a program storage unit, computer readable medium, or a non-transitory machine readable storage medium that can be in a form of a digital circuit, an analogy circuit, a magnetic medium, or combination thereof. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit.

The foregoing detailed description has set forth a few of the many forms that the invention can take. It is intended that the foregoing detailed description be understood as an illustration of selected forms that the invention can take and not as a limitation to the definition of the invention. It is only the claims, including all equivalents that are intended to define the scope of this invention.

What is claimed is:

1. A method for controlling the provision of resource nodes for streaming multimedia content of a channel viewed by consumer nodes in a peer-to-peer network wherein each consumer node is at least a computing device, comprising:
   initializing the channel with at least an initial number of resource nodes allocated to provide a desired level of quality of service (QoS) to the consumer nodes, the resource nodes and the consumer nodes are part of the peer-to-peer network;
   checking periodically a number of consumer nodes currently connected to the channel and an experienced level of QoS of the channel;
   predicting, based on the number of the consumer nodes currently connected, an increase trend or a decrease trend in the number of consumer nodes, and the experienced level of QoS level, a number of predicted consumer nodes of the channel and a predicted number of resource nodes required to provide the desired level of QoS;
   changing the number of resource nodes allocated to the channel to provide the desired level of QoS and to meet the predicted number of consumer nodes; and
   changing the number of allocated resource nodes when a predicted level of QoS for the predicted number of consumer nodes is outside of a predefined QoS range, wherein changing the number of allocated resource nodes includes any one of:
   allocating additional resource nodes to the channel if the predicted number of consumer nodes is higher than the number of consumer nodes currently connected or the predicted level of QoS is below a predefined minimum level of QoS; and
   deallocating resource nodes from the channel when the number of predicted consumer nodes is less than the number of consumer nodes currently connected to the channel or the predicted level of QoS is above a predefined maximum level of QoS.

2. The method of claim 1, wherein allocating the additional resource nodes further comprising overshooting the number of predicted resource nodes.

3. The method of claim 1, wherein allocating the additional resource nodes further comprising at least one of allocating at a higher priority backup resource nodes reserved to the channel and allocating at a lower priority resource nodes allocated to a different channel.

4. The method of claim 1, wherein deallocating the resource nodes further comprising proportionately reducing the number of allocated resource nodes.

5. The method of claim 4, wherein the proportionate reduction in the number of allocated resource nodes is performed after at least one of at least two consecutive decreases in the number of consumer nodes and a predetermined period of time from a predicted decrease in the number of consumer nodes.

6. The method of claim 1, wherein the initialization further comprising:
   receiving a hint respective of an expected number of consumer nodes of the channel; and adjusting the initial allocation of resource nodes to the channel based on the hint.

7. The method of claim 1, is executed by computer executable code stored in a non-transitory computer readable medium.

8. A system for providing streaming multimedia content in a peer-to-peer network, comprising:
- a broadcasting server for broadcasting a channel of the streaming multimedia content;
- a plurality of nodes that can act either as consumer nodes for viewing the channel or resource nodes for streaming multimedia content of the channel wherein the plurality of nodes is at least a computing device; and
- a management server for allocating an initial number of resource nodes from the plurality of nodes to provide a desired level of quality of service (QoS) to the channel and thereafter determining, based on a predicted number of consumer nodes, if a change in the number of initial allocated number of resource nodes is needed, wherein the management server is further configured to change the number of initial allocated resource nodes when a predicted level of QoS for the predicted number of consumer nodes is outside of a predefined QoS range, wherein changing the number of initial allocated resource nodes includes any one of:
- allocating additional resource nodes to the channel if the predicted number of consumer nodes is higher than the number of consumer nodes currently connected or the predicted level of QoS is below a predefined minimum level of QoS; and
- deallocating resource nodes from the channel when the number of predicted consumer nodes is less than the number of consumer nodes currently connected to the channel or the predicted level of QoS is above a predefined maximum level of QoS;
- wherein the management server, the broadcasting server, and the plurality of nodes are connected to a network.

9. The system of claim 8, wherein allocating the initial number of resource nodes further comprising:
- receiving a hint respective of an expected number of consumer nodes of the channel; and
- adjusting the initial allocation of resource nodes to the channel based on the hint.

10. The system of claim 9, wherein determining if the change in the initial number of allocated resource nodes is needed further comprising:
- checking periodically a number of consumer nodes currently connected to the channel and an experienced level of QoS of the channel;
- predicting, based on the number of the consumer nodes currently connected, an increase trend or a decrease trend in the number of consumer nodes, and the experienced level of QoS level, a number of predicted consumer nodes of the channel and a predicted number of resource nodes required to provide the desired level of QoS; and
- changing the number of resource nodes allocated to the channel to provide the desired level of QoS and to meet the predicted number of consumer nodes.

11. A server for controlling the provision of resource nodes for streaming multimedia content of a channel viewed by consumer nodes in a peer-to-peer network, comprising:
- a processor;
- a memory for containing instructions that when executed by the processor cause the processor to perform the steps of:
  - initializing the channel with an initial number of resource nodes allocated to provide a desired level of quality of service (QoS) to the consumer nodes, the resource nodes and the consumer nodes are part of the peer-to-peer network;
  - checking periodically a number of consumer nodes currently connected to the channel and an experienced QoS level of the channel;
  - predicting, based on the number of the consumer nodes currently connected, an increase trend or a decrease trend in the number of consumer nodes, and the experienced level of QoS level, a number of predicted consumer nodes of the channel and a predicted number of resource nodes required to provide the desired level of QoS;
  - changing the number of resource nodes allocated to the channel to provide the desired level of QoS and to meet the number of predicted consumer nodes; and
  - changing the number of allocated resource nodes when a predicted level of QoS for the predicted number of consumer nodes is outside of a predefined QoS range, wherein changing the number of allocated resource nodes includes any one of:
  - allocating additional resource nodes to the channel if the predicted number of consumer nodes is higher than the number of consumer nodes currently connected or the predicted level of QoS is below a predefined minimum level of QoS; and
  - deallocating resource nodes from the channel when the number of predicted consumer nodes is less than the number of consumer nodes currently connected to the channel or the predicted level of QoS is above a predefined maximum level of QoS.

\* \* \* \* \*